United States Patent [19]
Genbauffe

[11] Patent Number: 5,027,854
[45] Date of Patent: * Jul. 2, 1991

[54] FUEL CONTROL DEVICE, FUEL CONTROL SYSTEM USING THE DEVICE AND METHOD OF MAKING THE DEVICE

[75] Inventor: Francis S. Genbauffe, Irwin, Pa.

[73] Assignee: Robertshaw Controls Company, Richmond, Va.

[*] Notice: The portion of the term of this patent subsequent to Oct. 25, 2005 has been disclaimed.

[21] Appl. No.: 549,297

[22] Filed: Jun. 15, 1990

Related U.S. Application Data

[62] Division of Ser. No. 378,972, Jul. 12, 1989, Pat. No. 4,947,891, which is a division of Ser. No. 227,764, Aug. 3, 1988, Pat. No. 4,862,917, which is a division of Ser. No. 73,811, Jul. 15, 1987, Pat. No. 4,779,643.

[51] Int. Cl.⁵ ............................................. F16K 5/12
[52] U.S. Cl. ................................................. 137/599.2
[58] Field of Search ............ 137/599.2, 614.11, 614.12; 251/117, 183, 185, 208, 209

[56] References Cited

U.S. PATENT DOCUMENTS

| | | | |
|---|---|---|---|
| 1,939,709 | 12/1933 | Leese | 137/614.11 X |
| 2,554,470 | 5/1951 | Mueller | 137/599.2 |
| 2,628,588 | 2/1953 | Mehler | 137/208 X |
| 2,763,289 | 9/1956 | Mueller | 137/599.2 |
| 2,987,078 | 6/1961 | Du Perow | 137/599.2 |
| 3,014,489 | 12/1961 | Lamp et al. | 137/614.11 X |
| 3,645,494 | 2/1972 | Manoogian et al. | 251/209 X |
| 3,998,227 | 12/1976 | Holbrook et al. | 251/209 X |
| 4,123,036 | 9/1978 | Branson et al. | 251/180 |

Primary Examiner—Stephen M. Hepperle
Attorney, Agent, or Firm—Candor, Candor & Tassone

[57] ABSTRACT

A fuel control device, system using the device and method of making the same are provided, the device comprising a housing having a passage therethrough for interconnecting a fuel source with a main burner, a throttle valve unit disposed in the passage for throttling fuel flow through the passage to the burner, and a selector operatively interconnected to the throttle valve unit to operate the same, the throttle valve unit comprising a pair of members one of which is substantially stationary and the other of which is rotatable relative to the one member, the one member having a face and having an aperture interrupting the face thereof and passing therethrough, the other member having a face disposed in sliding engagement with the face of the one member for controlling the effective opening of the aperture for fuel flow therethrough, the selector being operatively interconnected to the other member to rotate the same relative to the one member and thereby control the flow of fuel through the passage, the other member having an opening interrupting the face thereof and being adapted to overlap the aperture in various positions therewith for controlling fuel flow therethrough, the other member comprising a plug valve member.

19 Claims, 9 Drawing Sheets

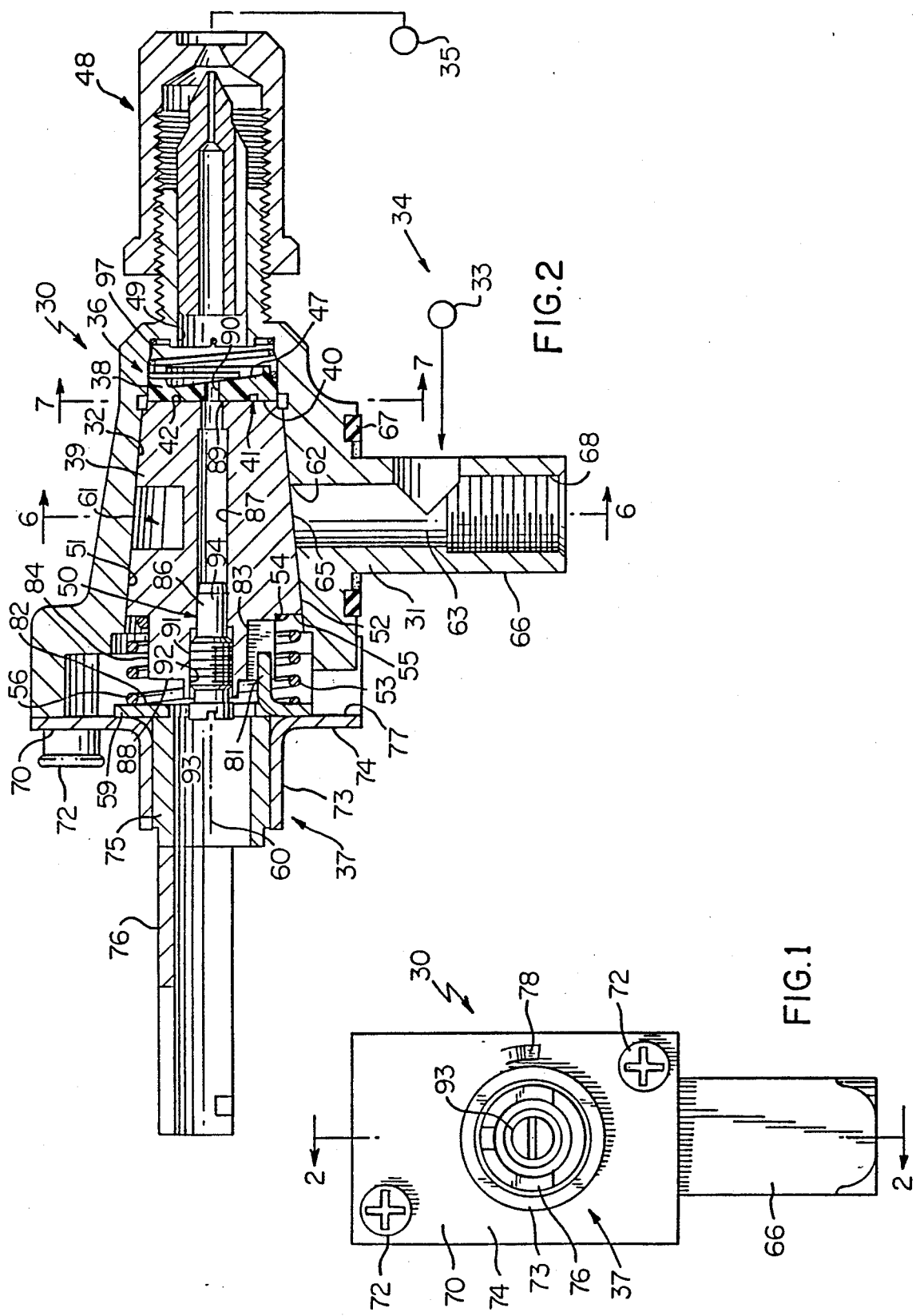

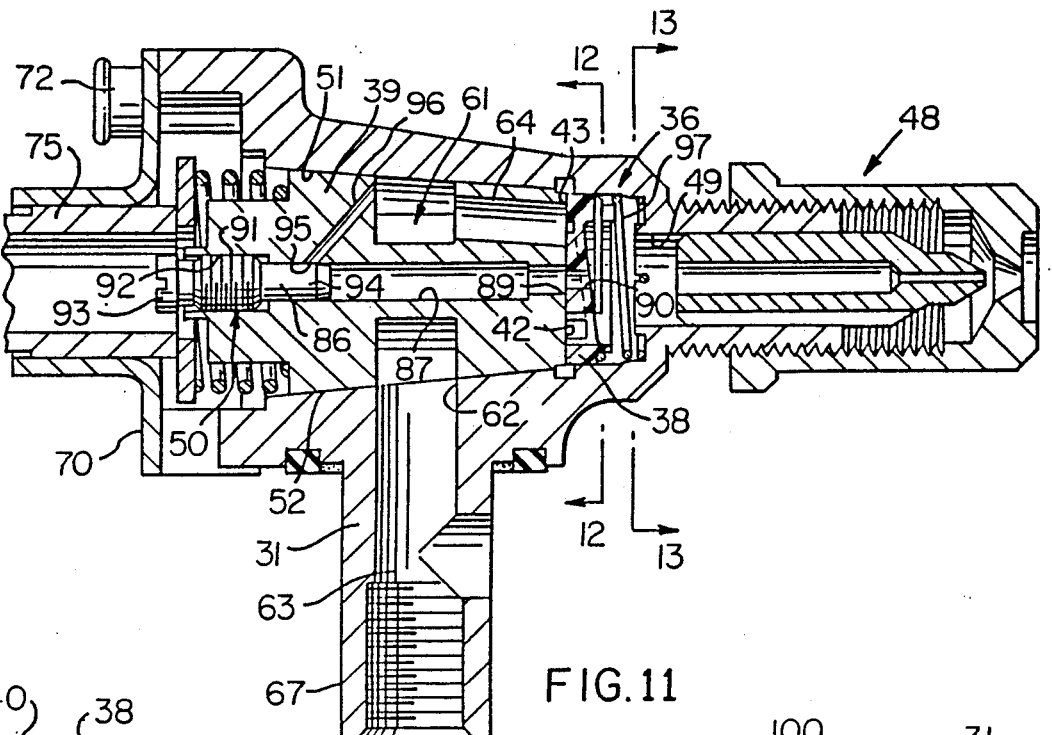

FUEL CONTROL DEVICE, FUEL CONTROL SYSTEM USING THE DEVICE AND METHOD OF MAKING THE DEVICE

CROSS REFERENCE TO RELATED APPLICATION

This application is a divisional patent application of its copending parent patent application, Ser. No. 378,972, filed Jul. 12, 1989, now U.S. Pat. No. 4,947,891, which, in turn, is a divisional patent application of its copending parent patent application, Ser. No. 227,764, filed Aug. 3, 1988, now U.S. Pat. No. 4,862,917, which, in turn, is a divisional patent application of its copending parent patent application, Ser. No. 073,811, filed July 15, 1987, now U.S. Pat. No. 4,779,643.

BACKGROUND OF THE INVENTION

1. Field of the Invention

This invention relates to a new fuel control device, such as for supplying gaseous fuel to a burner means, and to a fuel control system utilizing such device as well as to a new method of making such a fuel control device.

2. Prior Art Statement

It is known to provide a fuel control device comprising a housing means having a passage therethrough for interconnecting a fuel source with a main burner means, a throttle valve means disposed in the passage for throttling fuel flow through the passage to the burner means, and selector means operatively interconnected to the throttle valve means to operate the same, the throttle valve means comprising a pair of members one of which is substantially stationary and the other of which is rotatable relative to the one member, the one member having a face and having aperture means interrupting the face thereof and passing therethrough, the other member having a face means disposed in sliding engagement with the face of the one member for controlling the effective opening of the aperture means for fuel flow therethrough, the selector means being operatively interconnected to the other member to rotate the same relative to the one member and thereby control the flow of fuel through the passage, the other member having an opening interrupting the face means thereof and being adapted to overlap the aperture means in various positions therewith for controlling the fuel flow therethrough. For example, see the U.S. Pat. No. to Robinson, 2,540,056.

Also see the U.S. Pat. No. to Branson et al, 4,123,036 for another throttle valve means.

SUMMARY OF THE INVENTION

It is one feature of this invention to provide a new fuel control device for supplying fuel to a burner means and wherein the rate of fuel flow therethrough can be controlled by the operator in such a manner that the desired flame size at the burner means can be readily selected and can be readily repeated.

In particular, it was found according to the teachings of this invention that when a plug valve member is being utilized as the main on/off means for supplying fuel from a fuel source to a main burner means, such as a top burner means of a cooking apparatus, as well as for providing the means for adjusting the fuel flow rate to the burner means through a range between a maximum fuel flow rate and a minimum fuel flow rate, the adjustment of the plug valve member occurs over a relatively short range of rotational movement thereof so that it is relatively difficult for the operator to effectively control the flame size at the burner means, and, thus, select a flame suitable for simmering rather than for cooking and/or boiling, let alone provide the same flame size for the same operation at a later time.

However, it was found according to the teachings of this invention that a plug valve member can be uniquely constructed to cooperate with a stationary throttle valve member so as to control the flow of fuel through an aperture means in the stationary member in such a manner that the plug valve member is adapted to be rotated through a relatively long path of rotation thereof to provide various fuel flow rates through the aperture means so that the flame size at the burner means can be relatively accurately controlled by the operator and be readily repeatable.

For example, one embodiment of this invention provides a fuel control device comprising a housing means having a passage therethrough for interconnecting a fuel source with a main burner means, a throttle valve means disposed in the passage for throttling fuel flow through the passage to the burner means, and selector means operatively interconnected to the throttle valve means to operate the same, the throttle valve means comprising a pair of members one of which is substantially stationary and the other of which is rotatable relative to the one member, the one member having a face and having aperture means interrupting the face thereof and passing therethrough, the other member having a face means disposed in sliding engagement with the face of the one member for controlling the effective opening of the aperture means for fuel flow therethrough, the selector means being operatively interconnected to the other member to rotate the same relative to the one member and thereby control the flow of fuel through the passage, the other member having an opening interrupting the face means thereof and being adapted to overlap the aperture means in various positions therewith for controlling the fuel flow therethrough, the other member comprising a plug valve member.

Accordingly, it is an object of this invention to provide a new fuel control device having one or more of the novel features of this invention as set forth above or hereinafter shown or described.

Another object of this invention is to provide a new fuel control system utilizing such a fuel control device, the system of this invention having one or more of the novel features of this invention as set forth above or hereinafter shown or described.

Another object of this invention is to provide a new method for making such a fuel control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is an end view of the new fuel control device of this invention, the fuel control device having the control knob thereof removed.

FIG. 2 is a cross-sectional view taken on line 2—2 of FIG. 1, FIG. 2 also schematically illustrating the fuel control system of this invention.

FIG. 11 is a fragmentary cross-sectional view taken on line 11—11 of FIG. 9 and illustrates the fuel control device in the "on" position thereof that is also provided in FIGS. 9 and 10.

FIG. 12 is an enlarged cross-sectional view taken on line 12—12 of FIG. 11.

FIG. 13 is an enlarged cross-sectional view taken on line 13—13 of FIG. 11.

FIG. 14 is a fragmentary cross-sectional view taken on line 14—14 of FIG. 12.

FIG. 15 is a fragmentary cross-sectional view taken on line 15—15 of FIG. 13.

DESCRIPTION OF THE PREFERRED EMBODIMENTS

Figure 3:
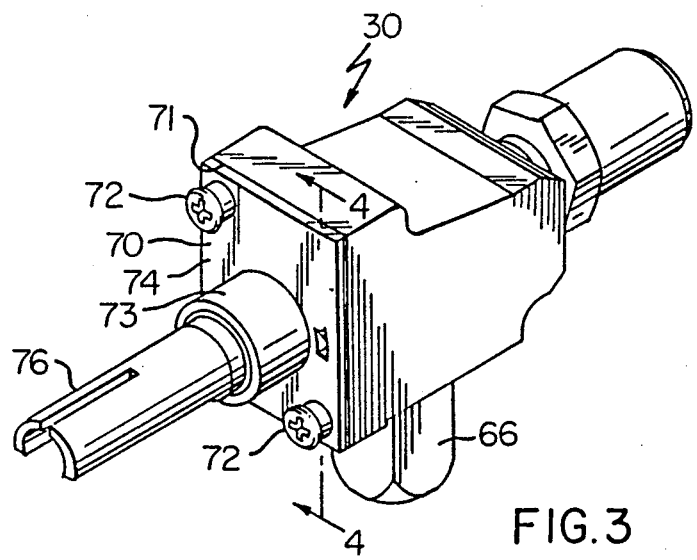
FIG. 3 is a reduced perspective view of the fuel control device of FIGS. 1 and 2.
Figure 4:
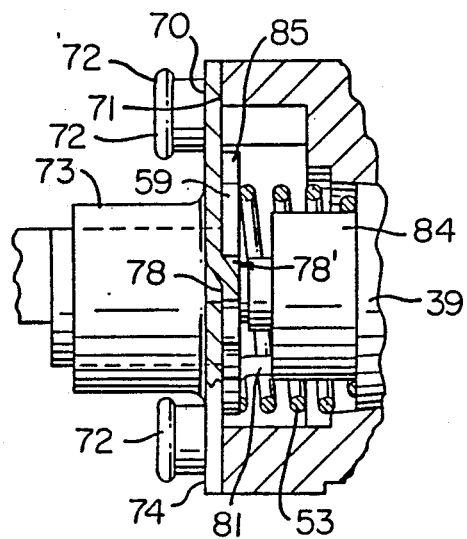
FIG. 4 is an enlarged fragmentary cross-sectional view taken on line 4—4 of FIG. 3.

While the various features of this invention are hereinafter illustrated and described as being particularly adapted to provide a fuel control device for supplying gaseous fuel to a burner means, such as from a source of propane or a source of natural gas, it is to be understood that the various features of this invention can be utilized singly or in various combinations thereof to provide a fuel control device for supplying other types of fuel as desired.

Therefore, this invention is not to be limited to only the embodiments illustrated in the drawings, because the drawings are merely utilized to illustrate one of the wide variety of uses of this invention.

Referring now to FIGS. 1, 2 and 3, the new fuel control device of this invention is generally indicated by the reference numeral 30 and comprises a housing means 31 having a passage 32 therethrough for interconnecting a fuel source 33 of a fuel control system of this invention that is generally indicated by the reference numeral 34 in FIG. 2 with a main burner means 35, such as the top burner means of a cooking apparatus (not shown). The housing means 31 has a throttle valve means that is generally indicated by the reference numeral 36 in FIG. 2 and that is disposed in the passage 32 thereof for throttling fuel flow through the passage 32 to the burner means 35. The fuel control device 30 further comprises a selector means that is generally indicated by the reference numeral 37 in FIG. 2 and is operatively interconnected to the throttle valve means 36 in a manner hereinafter set forth to operate the same.

The throttle valve means 36 of the fuel control device 30 of this invention comprises a pair of members 38 and 39, the member 38 having a substantially flat end face 40 and having an aperture means 41 interrupting the face 40 thereof and passing therethrough as hereinafter set forth. The member 39 of the throttle valve means 36 comprises a plug valve member having a substantially flat end face 42 disposed in sliding engagement with the face 40 of the member 38, the member 38 being substantially stationary in the housing means 31 while the plug valve member 39 is rotatable thereto.

The plug valve member 39 has an opening 43, FIG. 6, interrupting the face 42 thereof and being adapted to overlap the aperture means 41 in the member 38 in a manner hereinafter set forth in various positions therewith for controlling the fuel flow therethrough, the selector means 37 being operatively interconnected to the plug valve member 39 to rotate the same as will be apparent hereinafter.

Thus, in general it can be seen that the flow of fuel from the source 33 to the main burner means 35 can be controlled by an operator rotating the selector means 37 and, thus, rotating the plug valve member 39 so as to overlap the opening 43 of the plug valve member 39 with the aperture means 41 of the member 38 of the throttle valve unit 36 to control the rate of fuel flow through the aperture means 41 to the burner means 35 and thereby control the height of the flame at the burner means 35.

Figure 9:
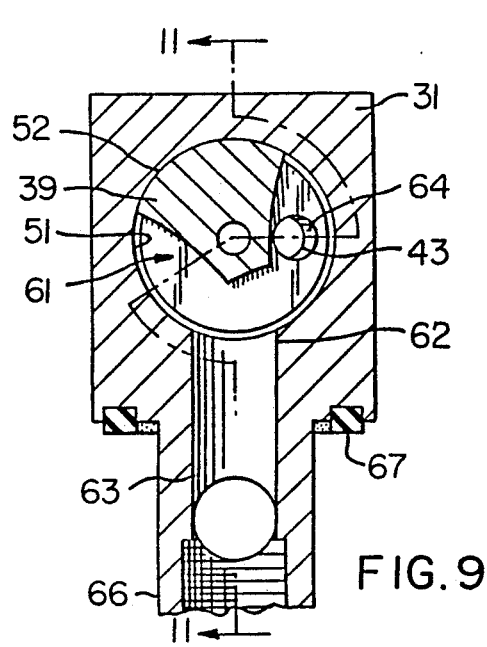
FIG. 9 is a fragmentary view similar to FIG. 6 and illustrates the fuel control device disposed in an "on" condition thereof.
Figure 10:
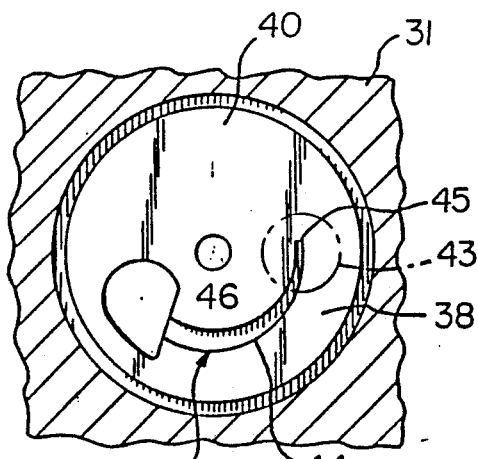
FIG. 10 is a view similar to FIG. 7 and illustrates the throttling valve means when set in the position of FIG. 9.

The aperture means 41 is formed in the face 40 of the member 38 so as to provide a relatively long arcuate section 44 between the opposed ends 45 and 46 thereof with the end 46 actually being an opening that passes completely through the member 39 from the front face thereof to the rear face 47 thereof and with the section 44 actually being a groove in the face 40. The plug valve member 39 can be rotated through a relatively long arcuate path from the "off" position of FIG. 7 to the final "on" position of FIG. 10 with the opening 43 of the plug valve member 39 20 first aligning with the opening 46 of the aperture means 41 when the control device 30 is first turned to an "on" position thereof so as to provide a full flow of fuel to the burner means 35 and thereafter reducing that amount of fuel flow as the opening 43 traverses along the grooved section 44 of the aperture means 41 from the end 46 thereof to the end 45 as illustrated in FIG. 10. In this manner, the flames at the burner means 35 will reduce in size from the size thereof that was created by the full flow of fuel to a simmering size when the plug valve member has the opening 43 thereof disposed in the position illustrated in FIGS. 9, 10 and 11 as will be apparent hereinafter. Thus, because of this long rotational path to move the opening 43 of the plug valve member 39 from the opening 46 to the end 45 of the groove 44, the operator can readily select any desired flame height between the full height thereof to the minimum height thereof.

Figure 7:
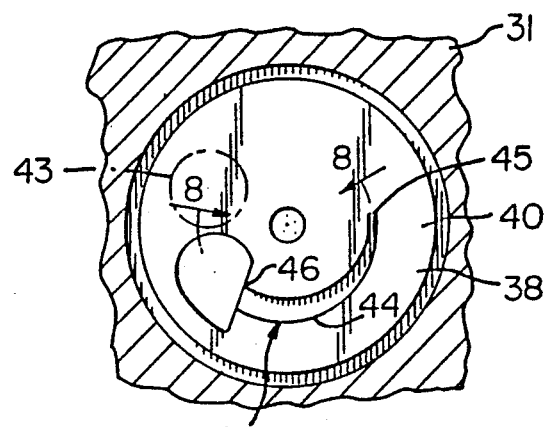
FIG. 7 is an enlarged fragmentary cross-sectional view taken on line 7—7 of FIG. 2.
Figure 26:
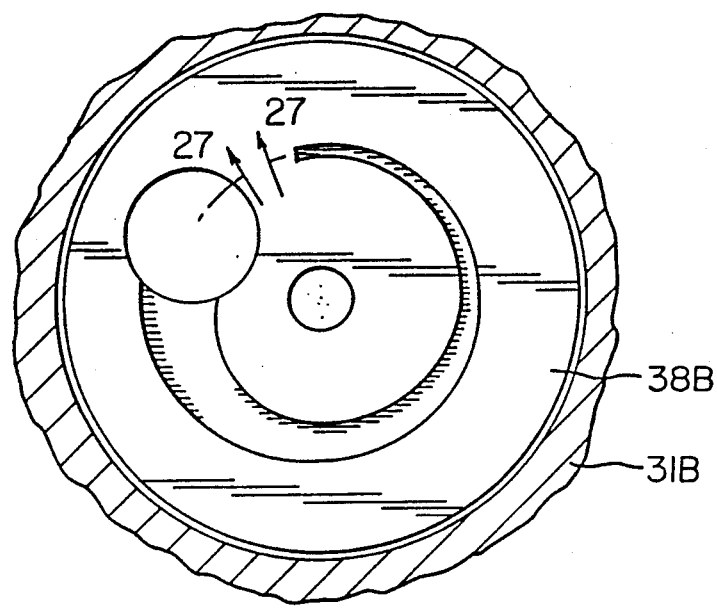
FIG. 26 is an enlarged fragmentary cross-sectional view taken on line 26—26 of FIG. 22.
Figure 27:
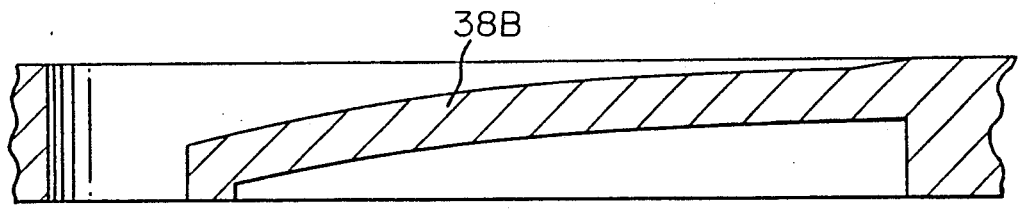
FIG. 27 is a schematic view taken substantially on the line 27—27 of FIG. 26.
Figure 28:
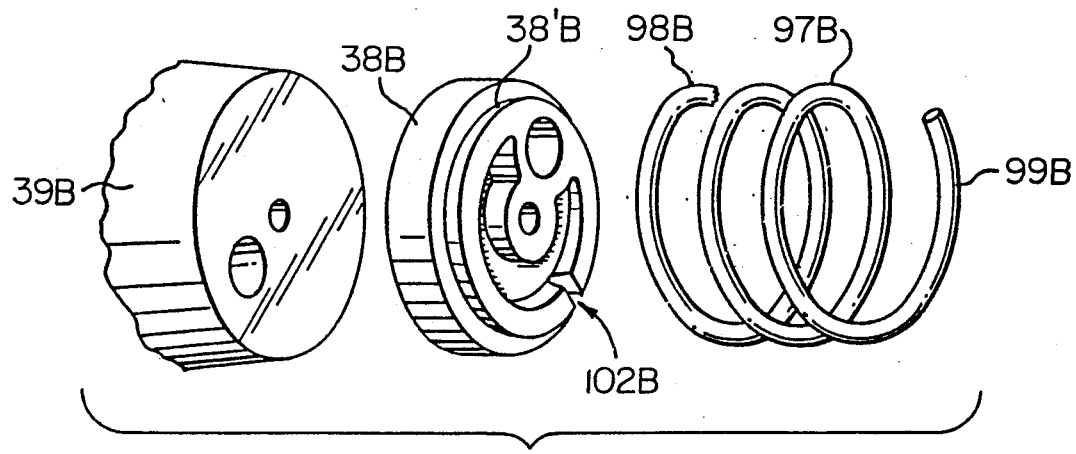
FIG. 28 is an exploded fragmentary perspective view of certain parts of the fuel control device of FIG. 22.

In fact, it can be seen in the embodiment illustrated in FIG. 26 that the arc or path of rotation is almost 360° whereas the arc or path of rotation in FIG. 7 is about 200°. Thus, it is to be understood that the aperture means 41 of this invention can be formed in any suitable manner to provide any suitable range of flow rate therethrough such as linear, exponential, stepped, etc. as will be apparent hereinafter.

However, in the embodiments illustrated in the drawings, the grooved section 44 of the aperture means 41 has been designed to be exponential, and thus, provide proportional flow from the end 45 thereof to the end 46 thereof as the opening 43 of the plug valve member 39 traverses over the aperture means 41 as hereinafter set forth.

While the member 38 of the throttling valve unit 36 can be formed of any suitable material, the same is formed of polymeric material and is suitably molded therefrom into the configuration illustrated.

However, such member 38 could be formed of any suitable material, such as of metallic material as provided in the fuel control device 30B illustrated in FIGS. 22-28 wherein parts thereof similar to the fuel control device 30 previously set forth and hereinafter set forth are indicated by like reference numerals followed by the reference letter "B".

Figure 8:
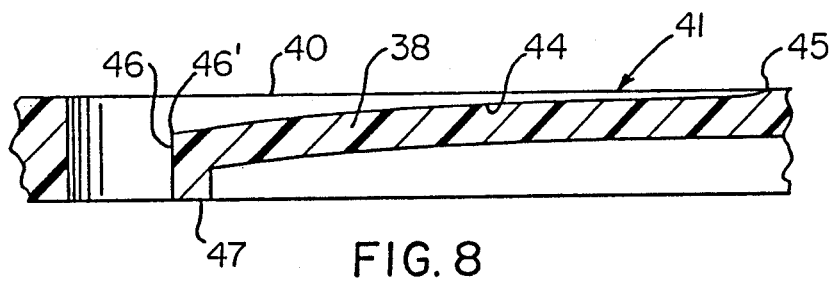
FIG. 8 is an enlarged fragmentary cross-sectional view taken on line 8—8 of FIG. 7.

The grooved section 44 of the aperture means 41 of the throttling valve member 38 has a substantially square transverse cross-sectional configuration from the end 45 thereof to the point 46' that is adjacent the end or opening 46 as illustrated in FIG. 8.

It is obvious that the grooved portion 44 can be computer designed so as to provide any flow rate increase as the opening 43 of the plug 39 traverses the same from the end 45 to the end 46' thereof and in the embodiment illustrated in FIGS. 7 and 8 of the drawings, such flow rate has been provided to be proportionally so that for each increment of movement of the opening 43 from the end 45 to the end 46, the flow rate increases approximately 10% over the flow rate of the last step thereof.

Thus, it can be easily seen that any variation or pattern desired could be designed in the throttle valve means 36 of this invention, i.e. by designing the aperture means 41 of the member 38 and the opening 43 of the plug valve member 39. In the preferred embodiment, such as for use with 10 inch W.C. propane gas and 4 inch W.C. natural gas, the groove restricting area 44 of the aperture means 41 ranges from the area required at the minimum position sized to provide minimum flow on LP gas which the burner can burn properly to adequate area at the high flow end to give 4 inch W.C. natural gas flow for full burner rate. This preferred embodiment varies the restriction of the aperture means 41 over the arc for a minimum flow to maximum flow exponentially. In this way the flow of fuel is altered by a given arc rotation an amount proportional to the flow. Thus, small flows get small changes and large flows get large changes until limited by the injection orifice that is generally indicated by the reference numeral 48 in FIG. 2 and is provided at the outlet means 49 of the housing means 31 in a conventional manner.

Obviously at the minimum flow position for LP gas, the aperture means 41 provides a restriction that is too small to allow the burner 35 to burn properly on 4 inch natural gas. For this reason, a minimum flow adjustable bypass key means that is generally indicated by the reference 50 in FIG. 2 is provided to adjust the minimum burner fuel flow to a level which is appropriate for proper minimum burner combustion and the range of flow again varies from minimum combustion to maximum flow established by the injection orifice means 48 over a smooth extended arc range with repeatable characteristics.

One working embodiment of the size of the grooved portion 44 of the aperture means 41 for use with both LP gas and natural gas will be hereinafter set forth.

The passage 38 of the housing 31 of the fuel control device 30 has a frusto-conical section 51 which receives the plug valve member 39 therein which has an external frusto-conical peripheral surface 52 that mates with the frusto-conical internal peripheral surface 51 of the housing 31 in a manner well known in the art to seal thereagainst as a compression spring 53 is disposed in the housing 31 and has one end 54 bearing against a shoulder 55 of the plug valve member 39 and another end 56 thereof bearing against a disk-like plate 59 of the selector means 37. In this manner, the compression spring 53 continuously urges the plug valve member 39 to the right in FIG. 2 to maintain its sealing relationship with the internal peripheral surface 51 of the housing means 31 while permitting rotational movement of plug valve member 39 about its longitudinal axis of rotation that is indicated by the reference numeral 60 in FIG. 2.

Figure 6:
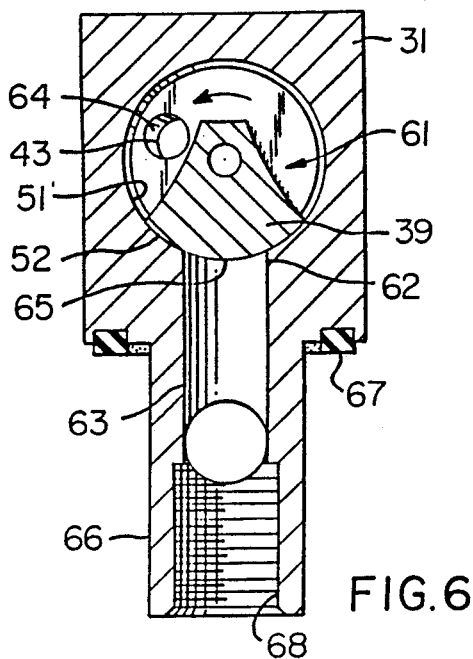
FIG. 6 is a cross-sectional view taken on line 6—6 of FIG. 2 and illustrates the fuel control device in the "off" position thereof.

As illustrated in FIGS. 2 and 6, the external peripheral surface 52 of the plug valve member 39 has an arcuate cutaway or slot means 61 formed therein which when brought into registry with an opening 62 that interrupts the internal peripheral surface 51 of the housing means 31 and is interconnected to an inlet means 63 of the housing means 31, fuel is adapted to flow from the source 33 into the slot 61 of the plug valve member 39 and is adapted to be directed to the opening 43 at the end face 42 of the plug valve member 39 as the opening 43 is interconnected to the slot 61 by an interconnecting passage 64 as illustrated in FIGS. 6 and 11.

Thus, it can be seen that when the plug valve member 39 has the non-slotted section 65, FIGS. 2 and 6, of the external peripheral surface 52 thereof closing off the port 62 in the housing means 31 as illustrated in FIGS. 2 and 6, fuel from the source 33 cannot reach the opening 43 of the plug valve member 39, and, thus, cannot be directed by the throttle valve means 38 to the main burner means 35 whereby such position of the plug valve member 39 is the "off" position of the fuel control device 30. However, when the plug valve member 39 is rotated by the selector means 37 on its axis 60 so as to bring the slot 61 into registry with the port 62 of the housing means 31, the fuel control device 30 is in an "on" condition thereof and fuel from the source 33 is adapted to be directed to the main burner means 35 through the throttle valve means 36 at the flow rate provided by the cooperation between the opening 43 of the plug valve member 39 and the aperture means 41 as previously set forth.

The inlet 63 of the housing 31 is formed in a tubular projection 66 of the housing 31 that is adapted to be inserted into a suitable opening in a fuel supplying manifold (not shown) and be sealed to such opening by an external annular sealing gasket means 67 and be fastened thereto by a suitable threaded fastening means (not shown) threading into an internally threaded portion 68 of the projection 66 and closing off the same so that fuel from such manifold can enter into the inlet 63 through a side port 69 that is schematically illustrated in FIG. 2 as being interconnected to the fuel source 33.

However, it is to be understood that the inlet 63 of the control device 30 of this invention can be interconnected to a fuel source in any suitable manner as such a manifold arrangement does not form any part of this invention.

The selector means 37 of the control device 30 includes a cover member 70 secured to an end surface 71 of the housing 31 by suitable fastening means 72 as illustrated, the cover plate 70 having a tubular extension 73 extending from the side 74 thereof and having a tubular portion 75 of a "D" shaped selector shaft means 76 rotatably disposed therein and being secured to the plate 59 which is urged against the other side 77 of the cover plate 70 by the compression spring 53 as illustrated.

The cover plate 70 has a tang 78 carved therefrom and extending inwardly toward the plug valve member 39, the tang 78 being adapted to be received in a locking notch 78' formed in an external peripheral surface 79 of the rotatable plate 59 and being bordered on one side thereof by an outwardly extending tang means 80.

The rotatable plate 59, in turn, has a drive tang 81 extending from the side 82 thereof and being received in a notch or cutout 83 formed in a reduced cylindrical extension 84 of the plug valve member 39 so that rotation of the plate 59 causes the plug valve member 39 to rotate in unison therewith.

Figure 5:
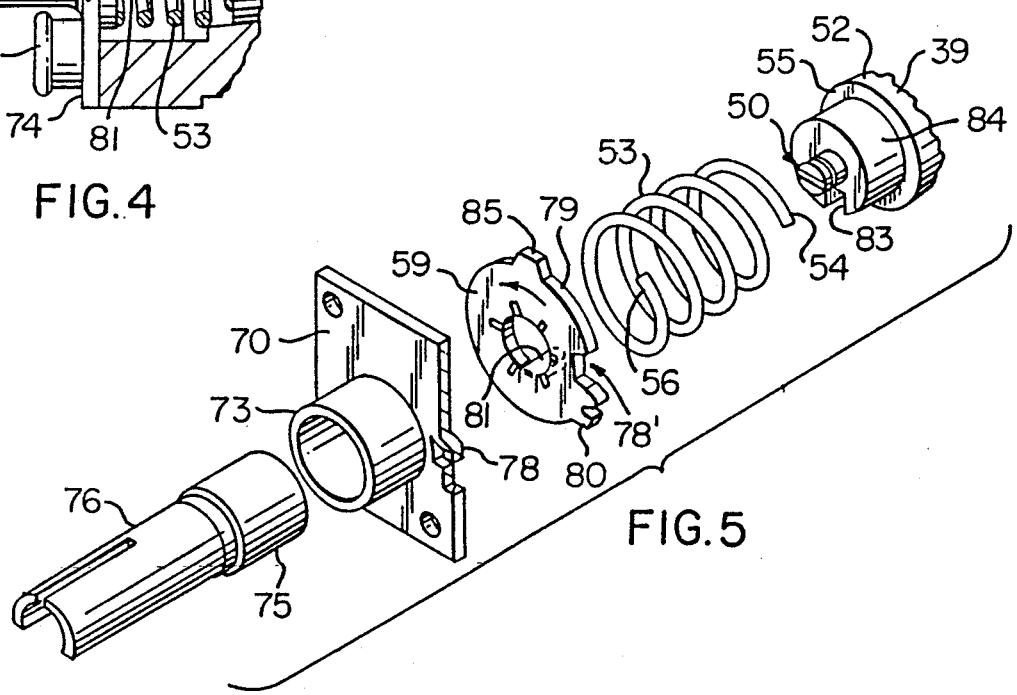
FIG. 5 is an exploded perspective view of certain parts of the control device illustrated in FIG. 4.

Thus, it can be seen that in order to move the plug valve member 39 from its "off" position to an "on" position thereof, the operator, through a control knob (not shown), connected to the left hand end of the selector shaft 76 in FIG. 2 merely pushes axially inwardly on the shaft 76 to the right in FIG. 2 to cause the plate 59 to have its notch 78' moved axially away from the locking tang 78 of the cover plate 70 and thereby permit the plate 59 to be rotated by rotation of the selector shaft 76 in a counterclockwise direction as illustrated in FIGS. 5 and 6 until the tang 80 of the plate 59 clears the locking tab 78 so that the compression spring 53 can return the plate 59 against the inside surface 77 of the cover plate 70. The plate 59 can be further rotated in a counterclockwise direction until a stop tang 85 of the plate 59 abuts against the locking tang 78, such movement of the plate 59 between the tangs 80 and 85 engaging with the locking tang 78 of the cover plate 70 being the operating range of rotational movement of the plug valve member 39 which is interconnecting its opening 43 in overlapping relation with the aperture means 41 of the plate 38 to provide the controlled flow rate of fuel therethrough to the burner means 35 as previously set forth.

The adjusting key means 50 of the plug valve member 39 comprises a rotatable adjusting key 86 disposed within a passage 87 that passes longitudinally through the plug valve member 39 from the end 88 thereof to the face 42 thereof and thereby forms a bypass opening 89 in the face 42 of the plug valve member 39 that aligns with a bypass opening 90 that interrupts the cooperating face 40 of the member 38 and extends completely through the same to the other side 47 thereof as illustrated. Thus, it can be seen that the openings 89 and 90 of the plug valve member 39 and throttle valve member 38 are always in alignment with each other as the same are disposed on the axis of rotation 60 of the plug valve member 39.

The adjusting key 86 has an externally threaded portion 91 that is threadedly disposed in an internally threaded portion 92 of the opening of the passage 87 and has a bifurcated end 93 extending out of the end 88 of the plug valve member 39 so as to be accessible for adjusting a fuel controlling portion 94 thereof relative to a port 95 that intersects with the passage 87 of the plug valve member 39 and leads to the slotted portion 61 of the plug valve member by an angled passage means 96 as fully illustrated in FIG. 11.

In this manner, proper adjustment of the adjusting key 86 will provide the desired minimum flow of fuel from the slotted portion 61 of the plug valve member 39 to the burner means 35 through the cooperating bypass ports 89 and 90 of the plug valve member 39 and throttle valve member 38 when the plug valve member 39 is set in the minimum flow position as illustrated in FIG. 10 wherein the opening 43 thereof is disposed at the end 45 of the groove 44 for the purpose previously set forth and more fully hereinafter described.

The throttle valve member 38 is held substantially stationary in the valve housing 31 while being urged into sealing relation with the face 42 of the plug valve member 39 by a compression spring 97 that has one end 98 fastened to the throttle valve member 38 and another end 99 fastened to an internal annular shoulder means 100 of the housing means 31. The spring 97 is in coiled form and is so constructed and arranged that the same has relatively little torsional movement so that the throttle valve member 38 is held substantially stationary from a rotational standpoint while being axially moved by the compression spring 97 in a manner to have its face 40 held in sealing relation with the face 42 of the plug valve member 39.

In particular, the spring 97 has the end 98 thereof comprising a substantially straight length 101 disposed substantially transverse to the longitudinal axis of the coiled spring 97 and adapted to be snap-fittingly received in a notch 102 formed in the rear surface 47 of the throttle valve member 38 as illustrated in FIGS. 12 and 14 as well as have the last coil thereof frictionally disposed over a rearwardly extending projection 38' of the member 38 as illustrated.

The other end 99 of the spring 97 likewise has a straight end section 103 thereof disposed substantially transverse to the longitudinal axis of the coiled spring 97 and is adapted to be press fitted or deformed into the annular shoulder 100 of the housing means 31 by suitable tooling that forces the straight length 103 against the shoulder 100 so as to embed the length 103 into the tubular shoulder 100 as illustrated in FIGS. 13 and 15 whereby the metal of the tubular shoulder 100 is actually deformed partially around the straight length 103 of the spring 97 in the area of the arrows 104 in FIG. 15 so as to lock the end 99 of the spring 97 in place in the housing 31.

Figure 16:
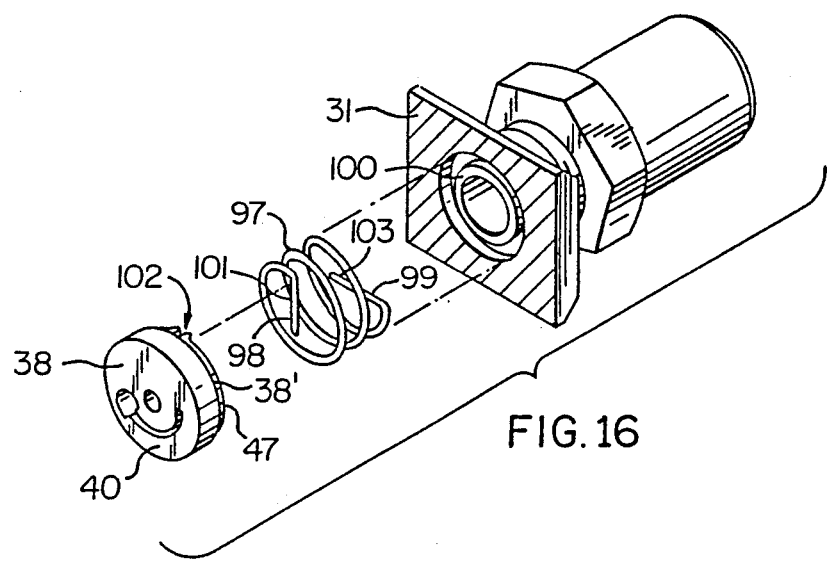
FIG. 16 is an exploded perspective view illustrating certain parts of the fuel control device of this invention before the same are assembled together.
Figure 17:
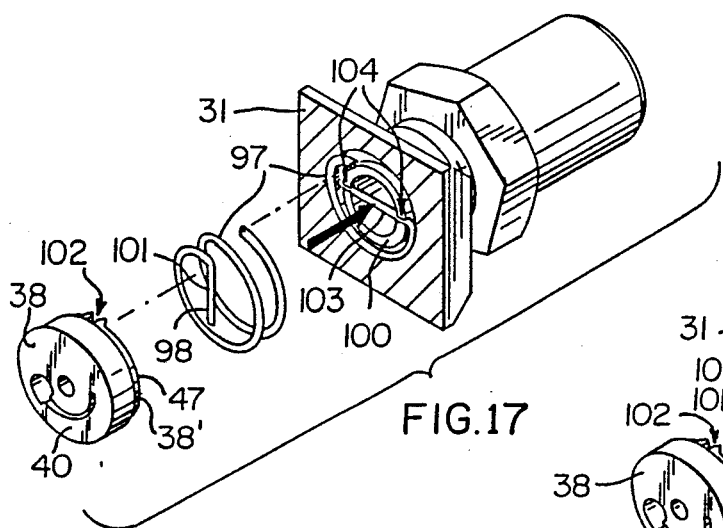
FIG. 17 is a view similar to FIG. 16 and illustrates how the spring means is first assembled to the housing of the fuel control device so as to orient a front part thereof.
Figure 18:
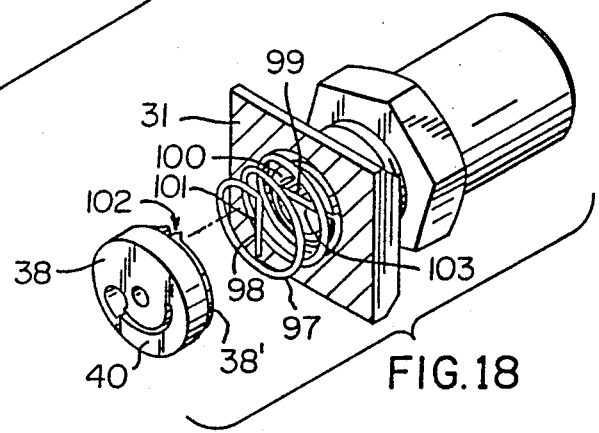
FIG. 18 is a view similar to FIG. 17 and illustrates how the valve member is then interconnected to the spring that has been fastened to the housing of the fuel control device.
Figure 19:
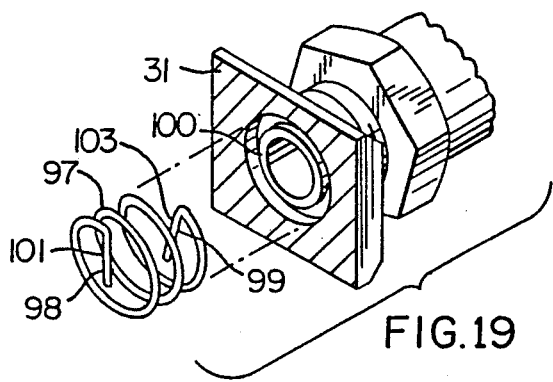
FIG. 19 is a view similar to FIG. 16 and illustrates another spring means to be assembled to the housing as set forth in FIG. 17.

Because it is necessary to orient the aperture means 41 of the throttle valve means 38 relative to the opening 43 in the face 42 of the plug valve member 39 during the assembly of the fuel control device 30, it was found that by holding the end 98 of the spring 97 with its straight length 101 always in a true vertically downwardly directed position so that the throttle valve member 38 will always be assembled thereto in the manner illustrated in FIGS. 16–18, then the rotational position of the end of the straight portion 103 of the end 99 of the spring 97 could be in any rotational position relative to the other end 98 thereof and still be secured to the annular shoulder 100 of the housing means 31 in the manner previously described. Thereafter, the throttle valve member 38 can be assembled to the end 98 and be properly oriented in the housing 31. For example, FIG. 19 shows the spring 97 having the end 99 thereof in another rotational position than the end 99 illustrated in FIGS. 16–18 but with the spring 97 having the end 98 thereof in the proper rotational position for properly positioning the throttle valve member 38 relative to the housing means 31.

Therefore, it can be seen that it is a relatively simple method of this invention to form the fuel control valve construction 30 of this invention to operate in a manner hereinafter to be described.

While the fuel control device 30 of this invention has the outlet 49 thereof extending to the right in FIG. 2, it is to be understood that the same could be directed in any direction relative to the inlet 63 as desired.

Figure 21:
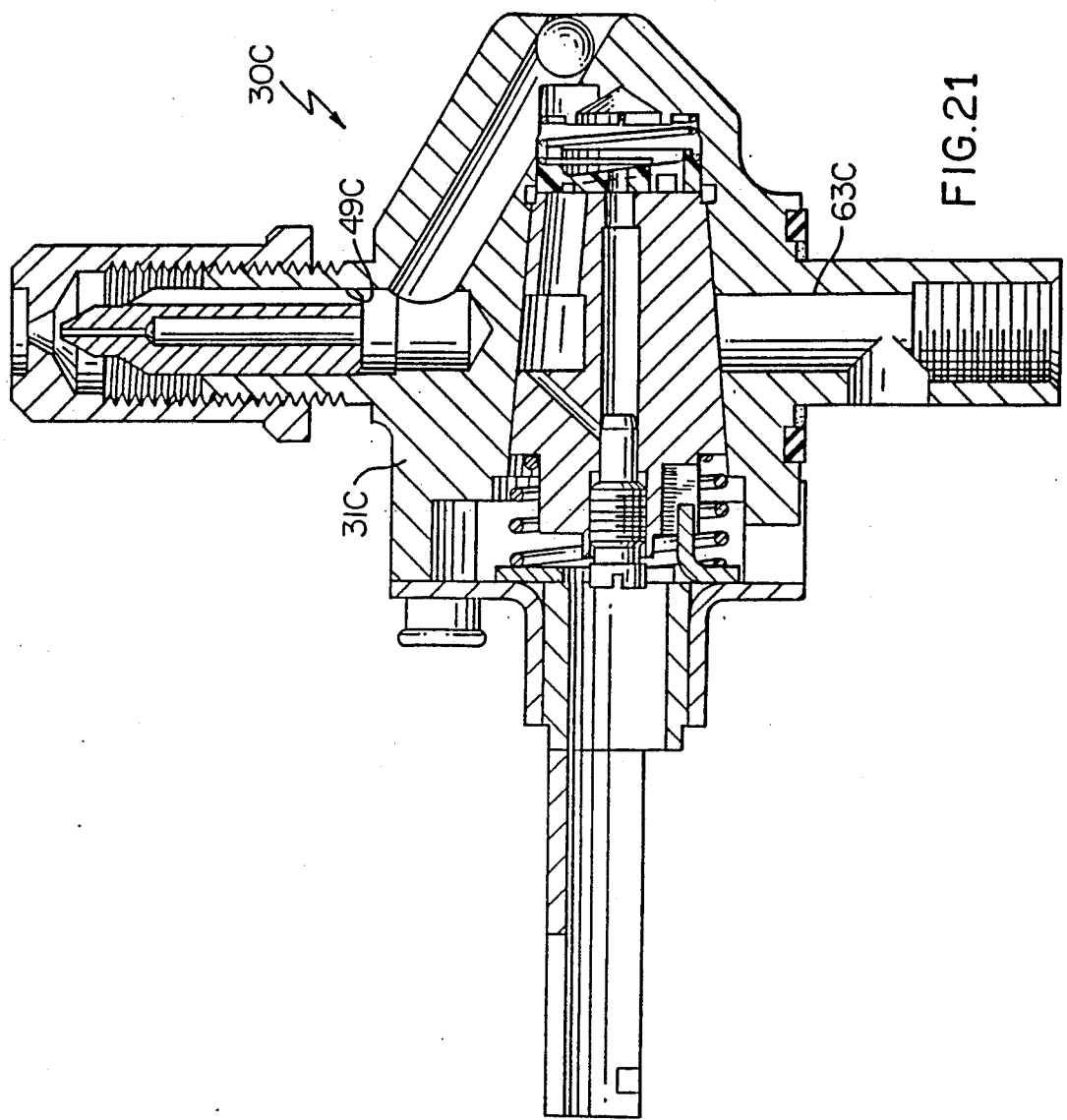
FIG. 21 is a cross-sectional view taken on line 21—21 of FIG. 20.
Figure 20:
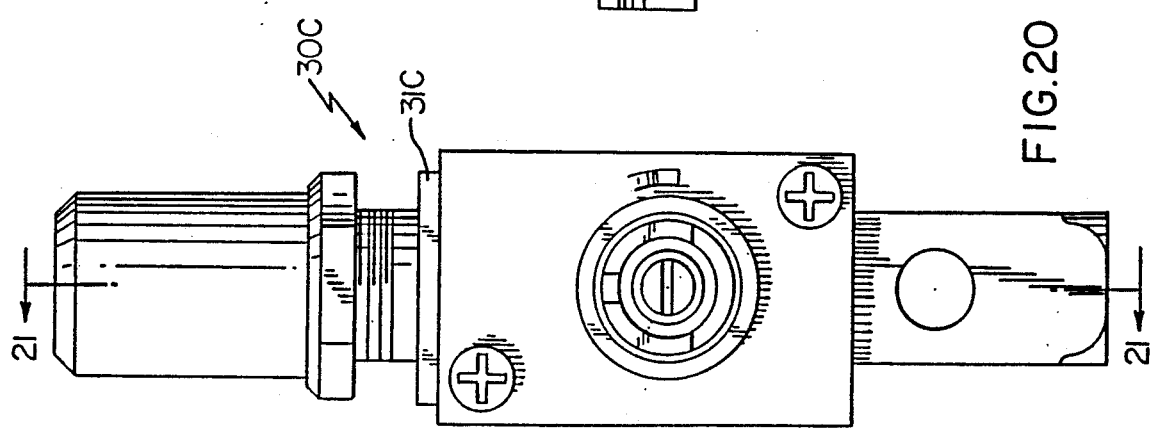
FIG. 20 is a view similar to FIG. 1 and illustrates another embodiment of the new fuel control device of this invention.
Figure 22:
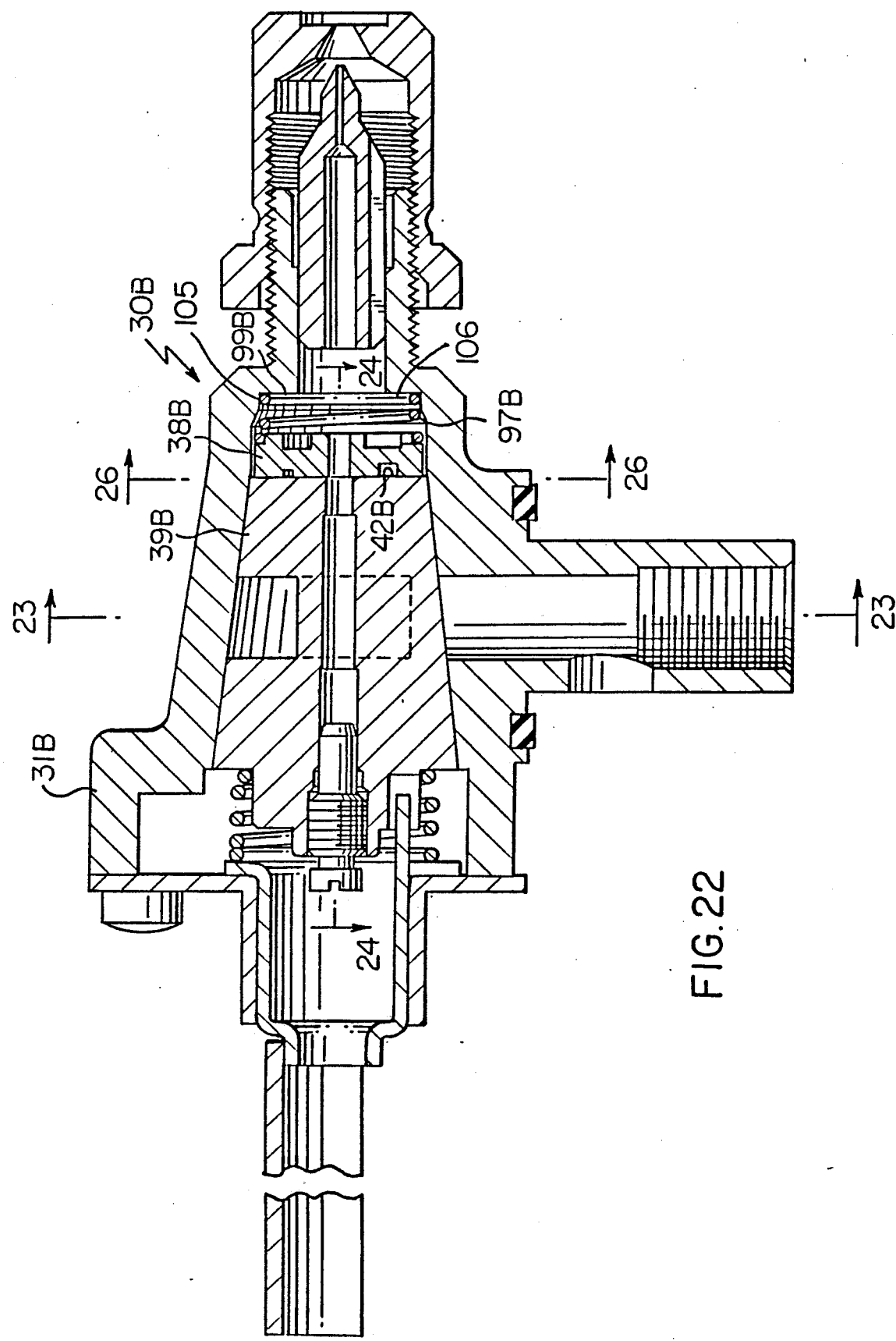
FIG. 22 is a view similar to FIG. 2 and illustrates another embodiment of the new fuel control device of this invention.
Figure 23:
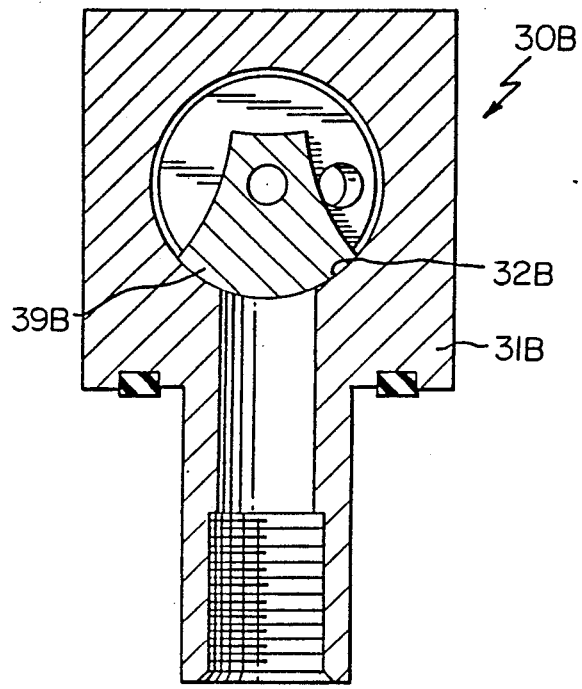
FIG. 23 is a cross-sectional view taken on line 23—23 of FIG. 22.
Figure 25:
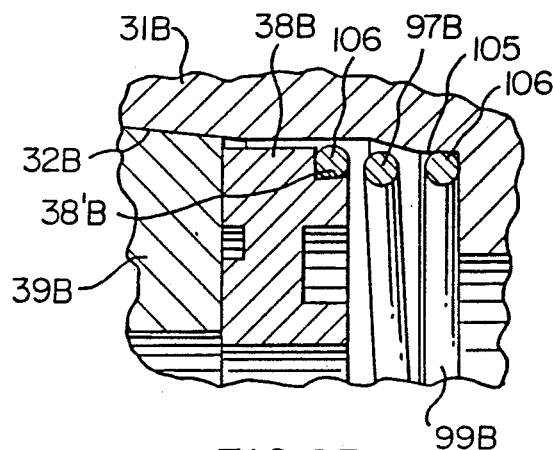
FIG. 25 is an enlarged fragmentary view of part of the structure illustrated in FIG. 24.
Figure 24:
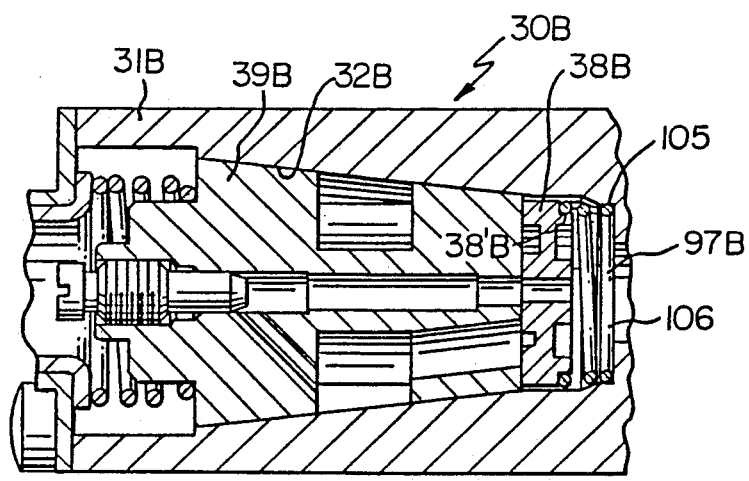
FIG. 24 is a fragmentary cross-sectional view taken on line 24—24 of FIG. 23.

For example, another fuel control device of this invention is generally indicated by the reference numeral 30C in FIGS. 20 and 21 and the parts thereof that are similar to the parts of the fuel control device 30 previously described are indicated by like reference numerals follows by the reference letter "C".

As illustrated in FIGS. 20 and 21, it can be seen that the fuel control device 30C is substantially the same as the fuel control device 30 previously described except that the outlet means 49C thereof is directed vertically upwardly in aligned relation with the inlet 63C as the housing means 31C has an outer configuration that is different than the housing means 31 previously described.

Since the operation of the fuel control device 30C is substantially the same as the fuel control device 30 previously described, a further discussion of the fuel control device 40C need not be set forth.

Likewise, the fuel control device 30B illustrated in FIGS. 2–28 also operates in the same manner as the fuel control device 30 previously described and therefore need not be further described except that it can be seen that compression spring 97B thereof that urges the throttle valve plate 38B against the face 42B of the plug valve member 39B has its end 99B press fitted into a reduced annular portion 105 of the internal passage 32B of the housing means 31B so that the resistance fit between that reduced portion 105 of the housing means 31B and the end coil 106 of the spring 97B holds the end 99B of the spring 97B in position to prevent rotational movement thereof and, thus, rotational movement of the throttle valve member 38B while causing axial movement of the member 38B into sealing relation against the end face 42B of the plug valve member 39B in the manner previously set forth as the end 98B of the spring 97B has the last coil thereof frictionally disposed around the tubular extension 38'B of the member 38B and has the straight end portion (not shown) locked in the notch 102B of the throttle valve member 38B as previously set forth.

When it is desired to operate the fuel control device 30 of this invention in the fuel control system 34 illustrated in FIG. 2, the operator merely pushes inwardly on the control shaft 76 to free the plate 59 from the locking tang 80 in the manner previously described and rotates the shaft 76 in a counterclockwise direction in FIG. 1 to initially align the opening 43 of the plug valve member 39 with the opening 46 of the aperture means 41 so as to provide a full flow of fuel to the main burner means 35, such issuing fuel from the main burner means 35 being ignited in any suitable manner, such as by a standing pilot means, a spark igniter means, etc., in a manner conventional in the art.

Should the operator desire to reduce the flame size at the burner means 35 below the highest flame provided by full flow through the opening 46 of the throttle valve member 38, which flame size is normally provided for boiling, the operator further rotates the selector shaft 76 in the counterclockwise direction in FIG. 1 to cause the opening 43 of the plug valve member 39 to begin to traverse across the grooved portion 44 of the aperture means 41 in the throttle valve member 38 so that the amount of fuel being directed to the main burner means 35 is progressively reduced in a proportional manner such that when the opening 43 is about halfway between the opposed points 47 and 48 of the grooved portion 44 of the aperture means 41, the flame size is in the normal cooking range size thereof. However, further counterclockwise rotation of the shaft 76 causes the opening 43 of the plug valve member 39 to move closer toward the tail end 45 of the grooved portion 44 and the flame size resulting therefrom progressively reduces until the flame size is at a minimum simmering flame size for simmering purposes and the like.

It has been found that because of the relatively long path of the grooved portion 44 of the aperture means 41 of this invention, the operator can repeatedly select the desired flame size previously used for various operations and the operator can coordinate the selection of the flame size by merely noticing where a suitable indicator on the selector knob (not shown) of the selector shaft 76 aligns with a dial indication means or the like whether the same be indicated by words, numbers, letters, etc. and even though the operator may not exactly align the selector knob with such indication means, the flame size selected will be close to the desired flame size because the long path of rotation of the plug valve member 39 makes the plug valve member 39 less sensitive to the positioning thereof than in prior known plug valve arrangements.

When it is desired to turn off the burner means 35, the operator turns the selector shaft 76 in a clockwise direction and when the tang 80 of the plate 59 reaches the tang 78 of the cover plate 70, the tang 78 permits the plate 59 to cam over the same so that the tang 78 snaps into the notch 78' to latch the control device 30 in its "off" position, the "off" position of the control device 30 being illustrated in FIG. 7 wherein it can be seen that the opening 43 of the plug valve member 39 is out of registry with the aperture means 41 of the throttle valve plate 38 and is sealed therefrom by the mating surfaces 42 and 40 of the members 39 and 38.

As previously stated, the particular aperture means 41 illustrated in the drawings has been computer designed so as to operate with both a typical natural gas source and a typical LP gas source when using a plug valve member 39 that has an opening 43 that is approximately 0.109 of an inch in diameter. The particular natural gas is supplied with an inlet pressure in W.C. of approximately 4 inches, has a specific gravity of approximately 0.6 and a BTU/cubic feet of 1,000 and has a desired flow rate that will produce approximately 9,000 BTU's after passing through the particular injection orifice 48 being utilized. The LP gas that is to be utilized has an inlet pressure in W.C. of approximately 10 inches, a specific gravity of approximately 1.53, a BTU/cubic feet of 2,500 and will provide a desired flow rate of approximately 9,000 BTU after passing through the particular injection orifice 48 being utilized.

The adjusting key means 50 can be set respectively for LP gas and natural gas so that when the opening 43 of the plug valve member 39 is adjacent the tail 45 of the grooved portion 44 of the aperture means 41 of the throttle valve member 38, the minimum flow to the burner means 35 will produce approximately 900 BTU. Conversely, when the opening 43 of the plug valve member 39 is in full registry with the opening 46 of the aperture means 41 of the throttle valve plate 38, the burner means 35 will produce approximately 9,000 BTU whether natural gas or LP gas is being utilized.

With such an arrangement, the grooved portion 44 of the aperture means 71 is laid out so that there are approximately twenty-two equal steps from the point 46' thereof to a point near the end 45 with the last step adjacent the end 45 being approximately 20° of an arc from the actual end point 45 thereof so that a certain amount of runout is permissible in the grooved portion 44, each step being approximately 5° apart when considering radius measurements from the center of the member 38.

As previously stated, the grooved portion 44 has a substantially square transverse cross-sectional configuration and the twenty-two steps provide a depth of the grooved section 44 as well as the width thereof from the smallest depth to the greatest depth at which point the large opening 46 is reached as follows:

| Step | Groove Depth In Inches |
|---|---|
| 1 | 0.0089 |
| 2 | 0.0089 |
| 3 | 0.0089 |
| 4 | 0.0096 |
| 5 | 0.0103 |
| 6 | 0.0111 |
| 7 | 0.0118 |
| 8 | 0.0126 |
| 9 | 0.0133 |
| 10 | 0.0144 |
| 11 | 0.0153 |
| 12 | 0.0162 |
| 13 | 0.0173 |
| 14 | 0.0183 |
| 15 | 0.0195 |
| 16 | 0.0207 |
| 17 | 0.0220 |
| 18 | 0.0234 |
| 19 | 0.0250 |
| 20 | 0.0268 |
| 21 | 0.0287 |
| 22 | 0.0311 |

-continued

| Step | Groove Depth In Inches |
|---|---|
| 23 | 0.0339 |

This arrangement provides twenty-five step positions equally spaced apart for the opening 43 of the plug valve member 38 to be in registry with such an aperture means 41 and with the combination providing the following TBU flow rates and with the opening 43 overlapping part of the opening 46 when step 21 is reached which corresponds to step 21 above:

| Step | LP Gas | Natural Gas |
|---|---|---|
| 25 | 9000 | 9000 |
| 24 | 8442 | 6798 |
| 23 | 7878 | 5585 |
| 22 | 7320 | 4768 |
| 21 | 6774 | 4163 |
| 20 | 6246 | 3689 |
| 19 | 5741 | 3303 |
| 18 | 5262 | 2981 |
| 17 | 4810 | 2707 |
| 16 | 4388 | 2470 |
| 15 | 3994 | 2264 |
| 14 | 3629 | 2083 |
| 13 | 3291 | 1922 |
| 12 | 2981 | 1779 |
| 11 | 2695 | 1651 |
| 10 | 2433 | 1537 |
| 9 | 2194 | 1434 |
| 8 | 1975 | 1342 |
| 7 | 1775 | 1258 |
| 6 | 1593 | 1183 |
| 5 | 1427 | 1114 |
| 4 | 1276 | 1052 |
| 3 | 1139 | 996 |
| 2 | 1014 | 946 |
| 1 | 900 | 900 |

Therefore, it can be seen from the above that such working embodiment of this invention provides a proportional flow through the control device 30 that is exponential as previously described. However, it is to be understood that this invention is not to be limited to any particular dimensions.

Thus, it can be seen that this invention provides a new fuel control device and method of making the same as well as a new fuel control system using such a fuel control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a fuel control device comprising a housing means having a passage therethrough for interconnecting a fuel source with a main burner means, a throttle valve means disposed in said passage for throttling fuel flow through said passage to said burner means, and selector means operatively interconnected to said throttle valve means to operate the same, said throttle valve means comprising a pair of members one of which is substantially stationary and the other of which is rotatable relative to said one member, said one member having a face and having aperture means interrupting said face thereof and passing therethrough, said other member having a face means disposed in sliding engagement with said face of said one member for controlling the effective opening of said aperture means for fuel flow therethrough, said selector means being operatively interconnected to said other member to rotate the same relative to said one member and thereby control the flow of fuel through said passage, said other member having an opening interrupting said face means thereof and being adapted to overlap said aperture means in various positions therewith for controlling said fuel flow therethrough, the improvement wherein said other member comprises a generally conical plug valve member having an axis of rotation and having an end surface disposed substantially transverse to said axis and comprising said face means thereof, and a spring means carried by said housing means and acting on said one member to tend to force said face of said one member against said face means of said plug valve member, said spring means comprising a coiled compression spring having opposed ends one of which is interconnected to said one member and the other of which is interconnected to said housing means whereby said one member is carried by said spring, said spring having relatively little torsional movement whereby said spring holds said one member substantially rotationally stationary relative to said housing means while permitting axial movement of said one member relative to said housing means.

2. A fuel control device as set forth in claim 1 wherein said opening of said plug valve member is offset relative to said axis of rotation thereof.

3. A fuel control device as set forth in claim 2 wherein said end surface of said plug valve member is substantially flat and said face of said one member is substantially flat.

4. A fuel control device as set forth in claim 3 wherein said plug valve member has a by-pass port interrupting said end surface thereof, said one member having a by-pass port interrupting said face thereof, said by-pass ports being in aligned relation and being coaxial with said axis.

5. A fuel control device as set forth in claim 4 wherein said plug valve member has a by-pass passage leading to said by-pass port thereof for providing a by-pass flow of fuel from said source to said burner means, said plug valve member having a by-pass adjusting key disposed in said by-pass passage for controlling the by-pass flow of fuel therethrough.

6. A fuel control device as set forth in claim 5 wherein said plug valve member has a portion thereof that closes said passage of said housing means when said plug valve member is disposed in an "off" position thereof, said opening of said plug valve member being out of communication with said aperture means of said one member when said plug valve member is in said "off" position thereof.

7. A fuel control device as set forth in claim 1 wherein said aperture means of said one member and said opening of said plug valve member are so constructed and arranged that the fuel flow rate therethrough can be exponentially changed as said plug valve member is being rotated relative to said one member by said selector means.

8. A fuel control device as set forth in claim 1 wherein said aperture means in said face of said one member defines a groove in said face that has opposed ends and an opening that passes completely through said one member, said opening of said one member comprising one of said opposed ends of said groove.

9. A fuel control device as set forth in claim 8 wherein said groove increases in size from the other of said opposed ends thereof to said one of said opposed ends thereof.

10. A fuel control device as set forth in claim 9 wherein said groove has substantially a square transverse cross-sectional configuration.

11. A fuel control device as set forth in claim 8 wherein said groove is arcuate between said opposed ends thereof.

12. A fuel control device as set forth in claim 11 wherein said groove is substantially radially disposed from said axis throughout the length of said groove.

13. A fuel control device as set forth in claim 12 wherein said opening of said plug valve member is offset relative to said axis and is movable along said groove in alignment therewith.

14. A fuel control device as set forth in claim 1 wherein said ends of said spring each comprise a substantially straight length disposed substantially perpendicular to the axis of said spring.

15. A fuel control device as set forth in claim 14 wherein said one end of said spring means is snap-fitted to said one member so as to be interconnected thereto and the other end of said spring is embedded into said housing means so as to be interconnected thereto.

16. A fuel control device as set forth in claim 1 wherein said opening of said plug valve member is substantially circular.

17. A fuel control device as set forth in claim 1 wherein said one member is formed of polymeric material.

18. A fuel control device as set forth in claim 1 wherein said plug valve member has a by-pass port means interrupting said face means thereof in spaced relation to said opening thereof, said one member having a by-pass port means interrupting said face thereof and being in communication with said by-pass port means of said valve member in substantially all operating positions of said valve member relative to said one member.

19. A fuel control device as set forth in claim 18 wherein said end surface of said valve member is substantially flat and said face of said one member is substantially flat, said by-pass port means being substantially coaxial with said axis.

* * * * *